(12) United States Patent
Wolters et al.

(10) Patent No.: US 7,491,762 B2
(45) Date of Patent: Feb. 17, 2009

(54) COMPOSITIONS COMPRISING METAL SALTS OF HEXAHYDROPHTHALIC ACID AND METHODS OF EMPLOYING SUCH COMPOSITIONS IN POLYOLEFIN RESINS

(75) Inventors: Weihua Sonya Wolters, Boiling Springs, SC (US); Kemper David Lake, Jr., Spartanburg, SC (US)

(73) Assignee: Milliken & Company, Spartanburg, SC (US)

(*) Notice: Subject to any disclaimer, the term of this patent is extended or adjusted under 35 U.S.C. 154(b) by 0 days.

(21) Appl. No.: 11/480,813

(22) Filed: Jul. 3, 2006

(65) Prior Publication Data

US 2008/0004384 A1 Jan. 3, 2008

(51) Int. Cl.
C08K 5/098 (2006.01)
C08K 5/092 (2006.01)
C08K 3/34 (2006.01)
C08K 3/36 (2006.01)

(52) U.S. Cl. .............. 524/399; 524/396; 524/397; 524/285; 524/492; 524/444; 524/445; 524/570; 525/240

(58) Field of Classification Search ............ 524/394, 524/400, 285, 444, 492, 585, 586, 582, 583, 524/584, 396, 399, 397
See application file for complete search history.

(56) References Cited

U.S. PATENT DOCUMENTS

| | | | | |
|---|---|---|---|---|
| 4,454,281 A | * | 6/1984 | Heitz et al. | 524/399 |
| 4,463,113 A | | 7/1984 | Nakahara et al. | 524/117 |
| 4,829,114 A | | 5/1989 | Trotoir et al. | |
| 5,001,542 A | * | 3/1991 | Tsukagoshi et al. | 257/746 |
| 5,342,868 A | | 8/1994 | Kimura et al. | 524/108 |
| 6,465,551 B1 | | 10/2002 | Zhao et al. | 524/284 |
| 6,562,890 B2 | * | 5/2003 | Dotson | 524/396 |
| 6,599,971 B2 | * | 7/2003 | Dotson et al. | 524/394 |
| 6,642,290 B1 | * | 11/2003 | Dotson | 524/108 |
| 6,703,434 B2 | | 3/2004 | Dotson | 524/108 |
| 6,794,433 B2 | | 9/2004 | Dotson et al. | 524/241 |
| 6,812,286 B2 | * | 11/2004 | Schardl et al. | 525/191 |
| 6,887,963 B2 | | 5/2005 | Dotson | 526/351 |
| 6,936,650 B2 | * | 8/2005 | Mannion et al. | 524/285 |
| 6,946,507 B2 | * | 9/2005 | Mannion et al. | 524/285 |
| 6,979,495 B2 | * | 12/2005 | Keung et al. | 428/476.1 |
| 6,995,202 B2 | | 2/2006 | Lake, Jr. et al. | 524/285 |
| 2004/0132884 A1 | | 7/2004 | Dotson et al. | |
| 2005/0038151 A1 | * | 2/2005 | Kochanowicz et al. | 524/264 |
| 2005/0038157 A1 | * | 2/2005 | Kochanowicz et al. | 524/284 |
| 2007/0036960 A1 | * | 2/2007 | Lambert et al. | 428/220 |

FOREIGN PATENT DOCUMENTS

JP 7-233290 * 9/1995
WO WO 95/02638 1/1995

OTHER PUBLICATIONS

JP 7-233290 (abstract and translation in English).*
Milliken & Company Announces Introduction of a Patented New Additive or use in Polyolefin Applications; web-based announcement—Oct. 2005.
Milliken & Company—Pending U.S. Appl. No. 10/703,855, filed Nov. 7, 2003. Title "Concentrates of Saturated Bicyclic Dicarboxylate Salts to Facilitate use thereof as Polymer Nucleation Additives".

* cited by examiner

*Primary Examiner*—Vasu Jagannathan
*Assistant Examiner*—Rip A. Lee
(74) *Attorney, Agent, or Firm*—Robert M. Lanning

(57) ABSTRACT

Compositions comprising hexahydrophthalate (HHPA) metal salts may be useful as nucleating agents in polyolefins. Masterbatch compositions containing such salts and silica and/or hydrotalcite are particularly useful in reducing haze and improving properties of manufactured polyolefin articles or film. Such compositions may be dispersed effectively and efficiently into resin during manufacturing operations in the form of a masterbatch, thereby providing excellent polymer crystallization temperatures, improved polymer physical properties, improved dimensional stability, and improved transparency.

12 Claims, 1 Drawing Sheet

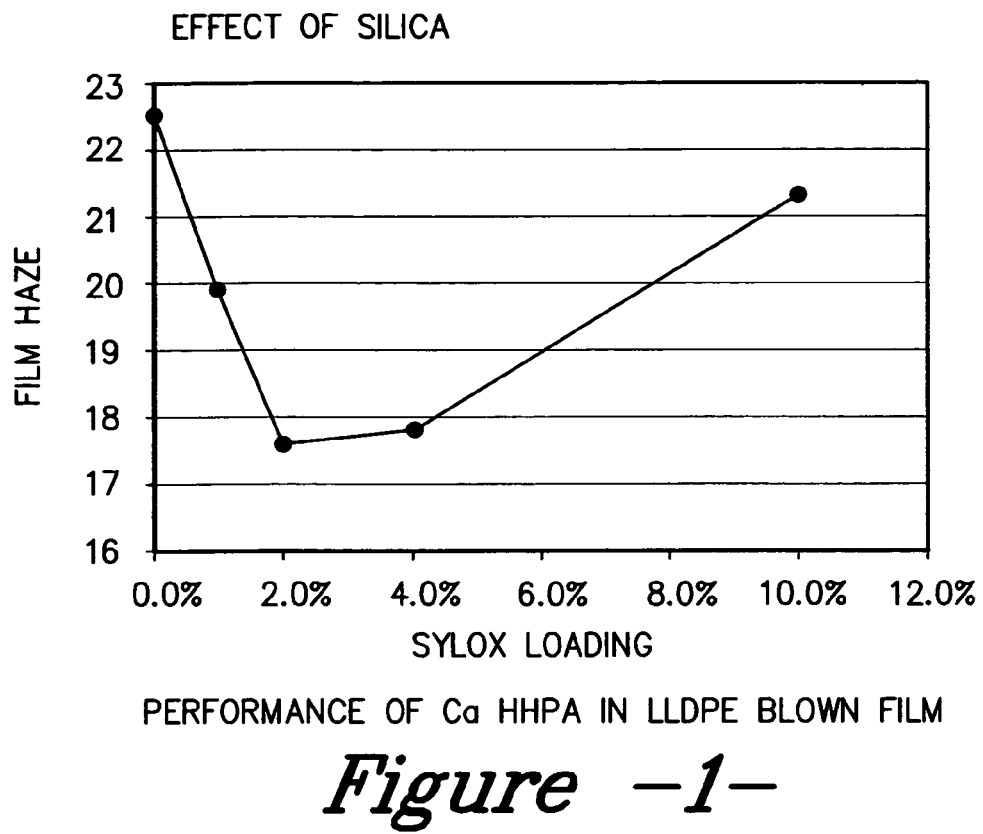
PERFORMANCE OF Ca HHPA IN LLDPE BLOWN FILM
*Figure -1-*
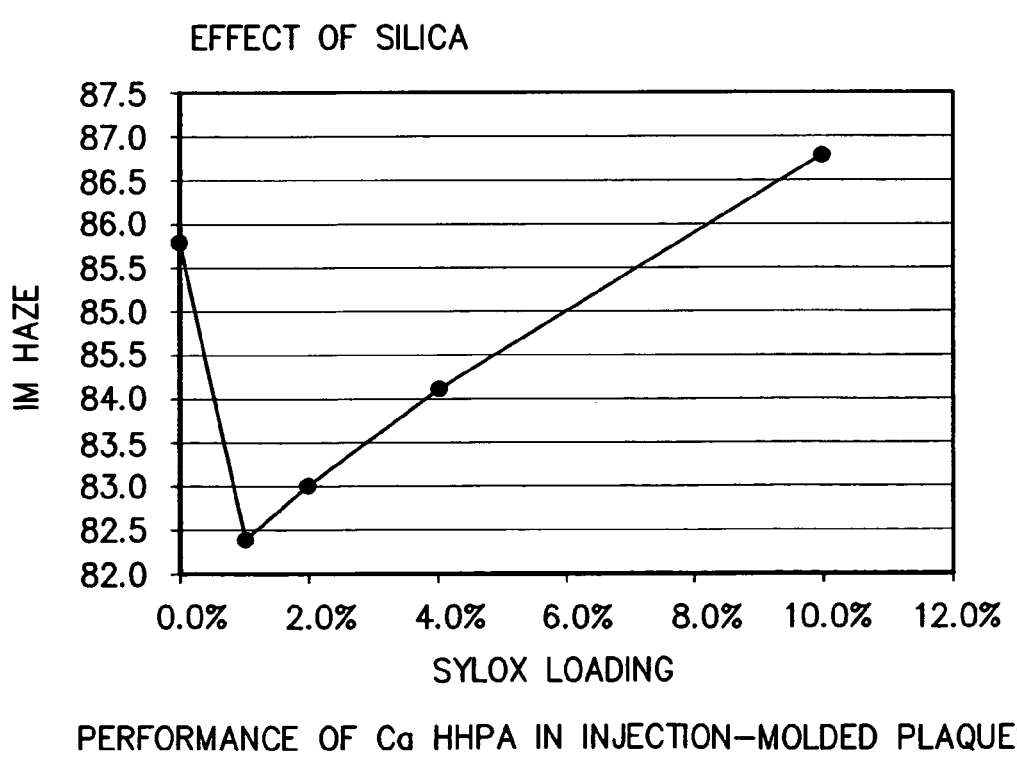
PERFORMANCE OF Ca HHPA IN INJECTION-MOLDED PLAQUES
*Figure -2-*

COMPOSITIONS COMPRISING METAL SALTS OF HEXAHYDROPHTHALIC ACID AND METHODS OF EMPLOYING SUCH COMPOSITIONS IN POLYOLEFIN RESINS

FIELD OF THE INVENTION

This invention relates to compositions, concentrates and masterbatches that employ metal salts of hexahydrophthalic acid ("HHPA") to provide highly desirable properties in the manufacture of thermoplastic or polyolefin-containing materials.

BACKGROUND OF THE INVENTION

Thermoplastics are used in a variety of end-use applications, including storage containers, medical devices, food packages, cast films, blown films, plastic tubes and pipes, shelving units, and the like. Base thermoplastic resin compositions, however, must exhibit certain physical characteristics to facilitate widespread use. To achieve desirable physical properties, certain compounds and compositions provide nucleation sites for polyolefin crystal growth during molding or fabrication. Generally, compositions containing such nucleating compounds crystallize at a much faster rate and crystallize at high temperature than non-nucleated polyolefins, which is desirable. Such crystallization at faster rate results in reduced fabrication cycle times and a variety of improvements in physical properties such as stiffness or warpage control. Furthermore, the clarity or haze characteristics of such fabricated articles is an important consideration. Articles or films with reduced amounts of haze are generally quite desirable.

Metal salts are useful as nucleating additives for thermoplastics. U.S. Pat. No. 6,599,971 discloses metal salts of HHPA for use in thermoplastics. Other published patents that are commonly owned by the owner of the current application and which relate to metal salt compounds and their use as nucleating agents in polymers include U.S. Pat. Nos. 6,562,890; 6,465,551; 6,642,290; 6,703,434; 6,794,433 and 6,887,963. Other commonly owned patents of interest include U.S. Pat. Nos. 6,936,650 and 6,946,507.

Milliken & Company of Spartanburg, S.C., USA ("Milliken") markets and sells a nucleating agent composition within its HYPERFORM® nucleating agent additive product line under the designation "HPN-20E™". The additive product HPN-20™ contains Ca HHPA (as shown below) combined with an acid scavenger compound, zinc stearate. This product is designed for addition to polymers, and for dispersion of the additive into polymer. This solid powdered additive material is made and sold in the United States for use by polyolefin producers and polymer compounders as a direct additive in polyolefin article manufacturing operations.

"Ca HHPA" as referred to herein shall refer to the following compound:

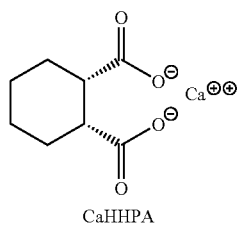

CaHHPA

Milliken also markets and sells other compounds as nucleating agents. For example, HYPERFORM® HPN-68L is a powdered solid nucleating agent manufactured by Milliken & Company in which the nucleating agent comprises a dicarboxylate Na-based compound known as HPN-68:

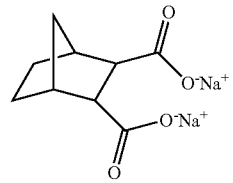

HPN-68

Cis-endo-bicyclo[2.2.1]heptane-2,3-dicarboxylic acid, disodium salt

Milliken manufactures and sells a masterbatch of the Cis-endo-bicyclo[2.2.1]heptane-2,3-dicarboxylic acid, disodium salt compound under the trademark HI5-5™, which is a commercially available concentrate in a carrier resin for easy and convenient use. U.S. Pat. No. 6,995,202 describes this masterbatch composition and method, which may employ a Na dicarboxylate metal salt compound for a masterbatch in polyolefins. This patent describes the use of a thermoplastic polymer in an additive concentrate masterbatch with a bicyclic dicarboxylate salt nucleating agent, and at least one dispersion aid additive. The dispersion aid additive may include: a metal carbonate, a metal sulfate, a blend of metal talcites and fatty acid salts, a blend of metal hydrotalcites and fatty acid salts, or a blend of metal dihydrotalcites and fatty acid salts, fatty ester-, acid-, or amide modified samples of such metal based compounds. In this patent, the nucleating agent is disclosed for a concentration in the masterbatch in an amount of from about 2-20% by total weight of the masterbatch concentrate.

Reducing haze in thermoplastic materials is highly desirable. In general, the use of co-additives is very unpredictable in the art of applying nucleating agents. It is almost always uncertain what co-additives at what concentrations may be used to improve polymer properties or haze levels. For that reason, substantial efforts have been made in the industry to improve the properties of polymeric films and polymeric articles. One way to make such improvements is to find by trial and error exactly which co-additives work together in synergy to produce effective results. This invention is directed to new compositions containing co-additives, and methods for using such co-additives for providing reduced haze and desirable properties in the manufacture of polymer film or other polymeric articles using the inventive compositions.

BRIEF DESCRIPTION OF THE DRAWINGS

A full and enabling disclosure of this invention, including the best mode shown to one of ordinary skill in the art, is set forth in this specification. The following Figures illustrate the invention:

FIG. 1 shows the effect of silica upon the usefulness of masterbatch formulations made using Ca HHPA in the manufacture of film; and FIG. 2 illustrates the effect of silica on the usefulness of masterbatch formulations made using Ca HHPA in the manufacture of injection molded plaques ("IM haze").

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention.

The invention may comprise a composition comprising: a polyolefin and a metal salt compound as shown below:

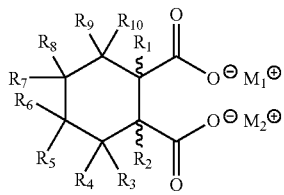

wherein $M_1$ and $M_2$ are the same or different, and may be combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogens, and phenyl, said metal salt compound being provided in a concentration of greater than about 0.5% by weight of the polyolefin composition; and silica. The composition may be in the form of a masterbatch, and may also include a stearate, such as zinc stearate, and a hydrotalcite compound. In one more specific embodiment, the invention comprises a masterbatch of polyolefin, Ca HHPA, and silica. Typically, the Ca HHPA is provided in a concentration of greater than about 0.5% by weight of the overall composition, as in the case of a masterbatch or concentrate. Further embodiments of the invention may include as well a hydrotalcite compound. The silica may be either hydrophilic or hydrophobic. Further, in some selected aspects of the invention, silica is provided in a concentration of less than about 5% of the composition (i.e. less than about 5% of the concentrate/masterbatch composition). The polyolefin may be polyethylene, polypropylene, or another known polyolefin such as polybutene, polyisoprene, or copolymers of such species. An acid scavenger such as a stearate may be employed, but is not required in the practice of the invention. Furthermore, an acid scavenger such as zinc stearate may be employed as an optional feature of the invention.

In yet another embodiment, the composition may include a polyolefin, a metal salt structure as generically shown, with greater than 0.5% by weight of the metal salt compound in the overall masterbatch, and a hydrotalcite compound. In this embodiment, the composition also may employ an optional acid scavenger, such as a stearate-containing compound. Zinc stearate may be particularly useful, but other stearates could be used as well, as optional additives into the masterbatch. Further, in yet another more specific embodiment of the invention, the Ca HHPA is employed as the metal salt compound. The Ca HHPA may be used at a concentration range of between about 0.5% and 20% by weight of the masterbatch concentrate.

Any of the embodiments described herein may be used to make solid polyolefin articles or polyolefin film, including for example polyethylene or polypropylene film. The invention may be used to manufacture linear low density polyethylene (LLDPE) blown film, by dispersing the masterbatch in LLDPE resin, and then preparing a blown film.

"Hydrotalcite compound" for purposes of its use in the invention refers to compounds which are either naturally occurring or synthetic hydrotalcite. One known and effective synthetic hydrotalcite compound that may be employed in the practice of the invention is set forth below in connection with Example 3 below, as in the form of: $(Mg_{4.3}Al_2(OH)_{12.6}CO_3$-$3.5H_2O)$(known commercially as DHT-4A, available from the Kyowa Chemical Industry Company of Kagawa, Japan).

Many plastic converters engaged in the transformation of resin or resin pellets into useful articles employ various types of additive concentrates to manufacture film, sheet, plaques, or other plastic articles. Such additive concentrates are sometimes referred to as "masterbatch" concentrates, or simply "masterbatch" materials. The use of such masterbatch concentrates is useful in manufacturing operations, as it provides a convenient means of adequately dispersing into a resin additives or additive "packages" in relatively low final concentrations. It can be very difficult or impossible in some instances to disperse quickly and efficiently an additive at relatively low concentration levels into a resin. Masterbatches, however, make this possible and convenient. Concentrates or masterbatch compositions typically contain a carrier resin. It is not necessary that the carrier resin be the same type of resin that is used for dispersal of said masterbatch. For example, a carrier resin may be used in a masterbatch that is a polypropylene carrier resin, in which the polypropylene-based masterbatch is dispersed ("let down") into a polyethylene for final article manufacture. This is just one example of how different resins may be used, by taking advantage of masterbatch intermediate compositions. Methods of employing each of the inventive compositions by combining the masterbatch (first polyolefin) with a second polyolefin to form a nucleated polyolefin composition are disclosed herein.

The additive concentrate of this invention may be used by a converter to easily "let down" the additive into the resin. By "let down" it is meant that the additive concentrate may be dispersed to a much lower concentration readily by mixing the additive into additional polymer resin. The masterbatch may be let down in processes such as injection-molding, film-blowing, extrusion blow molding or the like at a certain ratio to reach a final additive loading concentration in the manufactured plastic parts. Further, the use of a masterbatch facilitates relatively easy dispersion of such additives at low concentrations into a resin. A method is disclosed for making a nucleated polyolefin composition by providing a masterbatch composition comprising a polyolefin carrier, Ca HHPA nucleating agent, and silica and then mixing the masterbatch composition with a second polyolefin. This is by a "let down" step, which serves to disperse the Ca HHPA nucleating agent, thereby forming a nucleated polyolefin composition. The method optionally may employ a stearate-containing compound and/or a hydrotalcite compound. Yet another method of making a nucleated polyolefin composition involves making a masterbatch of a polyolefin carrier, a Ca HHPA nucleating agent, and a hydrotalcite compound.

Effective masterbatch compositions have been discovered, by way of the invention. Such composition provides improved dispersion and provides a very desirable and low haze for LLDPE blown film, injection molded polypropylene (PP) plaques, and injection molded polyethylene (PE) plaques. For purposes of this disclosure and claims herein, Ca HHPA shall refer to the following compound, described in commonly owned U.S. Pat. No. 6,599,971:

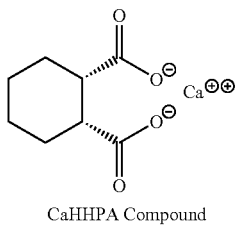

CaHHPA Compound

In one specific embodiment, the invention may exist as a combination of the following, which includes both a hydrotalcite compound and a silica compound:

1. DHT-4A ($Mg_{4.3}Al_2(OH)_{12.6}CO_3$-$3.5H_2O$), a synthetic hydrotalcite compound sold by Mitsui Chemical Company;
2. Sylox 2: a hydrophilic silica compound sold by Grace Davison Company;
3. Zinc stearate,
4. Ca HHPA; and
5. Polypropylene or polyethylene.

In the practice of the invention, the polypropylene may be homopolymer (HPP), random copolymer (RCP), or metallocene-catalyzed polypropylene. Polyethylene may be employed in the practice of the invention in the form of linear low density polyethylene (LLDPE), low density polyethylene (LDPE), high density polyethylene (HDPE), or metallocene-catalyzed polyethylene.

EXAMPLE 1

Loading Study of Silica in HPP-Based Masterbatch Concentrate

Polypropylene homopolymer (HPP) with a melt flow rate of 12 (gram/10 min) with an additive package consisting of antioxidants such as 500 ppm Irganox 1010 and 1000 ppm Irgafos 168 and acid scavenger such as 2% zinc stearate and 4% of a nucleating agent composition such as Ca HHPA were high-intensity blended and melt-compounded on a twin screw extruder. The formulations are listed in Table 1 (antioxidants are standard formulations which are well known in the industry and not listed hereafter). "Sylox 2" is a silica-based product of Grace Davison of Columbia, Md.

The concentrates made herein were let down into injection-molding grade linear low density polyethylene (LLDPE) resin and plastic plaques (1.27 mm) were made with the final 1000 ppm nucleating agent loading. Haze and Tc were measured and listed in Table 1. Tc refers to peak crystallization temperatures as determined by differential scanning calorimetry (DSC), at a cooling rate of 20 degrees C/minute. The haze results are also shown in FIG. 2. Furthermore, the Ca HHPA concentrates were let down into a film-grade linear low density polyethylene resin and blown films were made with 1000 ppm final Ca HHPA loading in the film. The film gauge was one mil and was established on a laboratory blown film line with 5 kg/hour throughput. Film haze was measured and shown in Table 1 and FIG. 1. All haze measurements herein were made according to ASTM-D-1003, which is incorporated by reference. Higher Tc indicates increased nucleation and subsequently faster polymer crystallization.

TABLE 1

Effect of Adding Silica at Various Loading Levels Upon Performance of Ca HHPA Concentrate

| Sample # | Carrier Resin | Co-additive | Loading | LLDPE Film haze | LLDPE IM haze | IM plaque Tc (C.) |
|---|---|---|---|---|---|---|
| 1 | 12 MFR HPP | | 0.0% | 22.5 | 85.8 | 110.0 |
| 2 | 12 MFR HPP | Sylox 2 | 1.0% | 19.9 | 82.4 | 111.0 |
| 3 | 12 MFR HPP | Sylox 2 | 2.0% | 17.6 | 83.0 | 110.6 |
| 4 | 12 MFR HPP | Sylox 2 | 4.0% | 17.8 | 84.1 | 110.6 |
| 5 | 12 MFR HPP | Sylox 2 | 10.0% | 21.3 | 86.8 | 110.3 |

Table 1, FIG. 1 and FIG. 2 clearly show that, at the appropriate loading levels, Sylox 2 significantly improves the performance of Ca HHPA concentrate both in LLDPE blown film and LLDPE injection-molding applications. It appears that the use of the Sylox 2 silica improves the dispersion of Ca HHPA in the polymer, either in the concentrate and/or after letting-down the concentrate into the base resin. One possible reason (mechanism) for the improvement may be attributed to a function of the Sylox 2 as a physical spacer between Ca HHPA particles, thereby preventing them from undesirably aggregating. This mechanism could also apply to other particulate additives, for other polymer systems as well.

EXAMPLE 2

Effect of DHT4A (A Hydrotalcite) in Improving the Performance of Ca HHPA Nucleating Agent in a Masterbatch Resin Polypropylene homopolymer (HPP) with a melt flow rate of 12 (gram/10 min) with 4% of a nucleating agent such as Ca HHPA and 1% of ZnSt and different loadings of DHT-4A were melt-compounded and concentrates (masterbatches) were made. The Ca HHPA concentrates were made as in Example 1, and were let down into injection-molding grade homopolymer polypropylene (HPP). Plastic plaques (1.27 mm) were made as in Example 1, with a final 1000 ppm Ca HHPA loading. Plaque haze and Tc were measured and listed in Table 2. The results clearly show that DHT-4A improves Ca HHPA dispersion and decreases injection-molded plaque haze when employed at appropriate loadings.

TABLE 2

Effect of DHT-4A Hydrotalcite Upon Performance of Masterbatch

| Sample # | MB Carrier resin | DHT-4A Loading | IM PP Plaque % Haze | Tc (C.) |
|---|---|---|---|---|
| 1 | 12 MFR HPP | — | 34.7 | 123.7 |
| 2 | 12 MFR HPP | 0.5% | 33.7 | 124.3 |
| 3 | 12 MFR HPP | 1% | 32.5 | 124.0 |
| 4 | 12 MFR HPP | 1.5% | 31.5 | 124.0 |
| 5 | 12 MFR HPP | 2% | 30.6 | 124.3 |
| 6 | 12 MFR HPP | 3% | 30.8 | 124.3 |
| 7 | 12 MFR HPP | 4% | 30.8 | 124.3 |
| 8 | 12 MFR HPP | 5% | 31.4 | 124.3 |
| 9 | 12 MFR HPP | 6% | 31.7 | 124.7 |

EXAMPLE 3

Effect of Adding Co-Additives of Silica and Hydrotalcite Upon Masterbatch Performance Concentrates were made using the method described in Example 1. Two different carrier resins and different co-additives were used. The concentrates were tested using LLDPE injection-molding and a laboratory-line LLDPE blown film as in Example 1. The haze numbers are shown in Table 3 and the results confirmed the findings from Example 1 and 2 above. For the data below in Table 3, all concentrate samples contain 4% Ca HHPA and 2% ZnSt and the let-down ratio (LDR) was 2.5% which leads to 1000 ppm Ca HHPA loading in the final film or plaque articles. Adding both co-additives further improves film haze. "ICP" refers to impact copolymer. "LLDPE" refers to linear low density polyethylene.

TABLE 3

Effect of the Co-additives on Performance of Ca HHPA Concentrates

| Sample # | Carrier Resin | Co-additive 1 | Loading of Co-additive #1 | Co-additive #2 | Loading of co-additive #2 | LLDPE IM haze % | LLDPE Film Haze % |
|---|---|---|---|---|---|---|---|
| 1 | LDPE | | | | | 80.2 | 20.5 |
| 2 | LDPE | DHT-4A | 2.0% | | | 78.3 | 18.2 |
| 3 | LDPE | Sylox 2 | 1.0% | | | 77.3 | 18.5 |
| 4 | LDPE | Sylox 2 | 2.0% | | | 77.3 | 18.5 |
| 5 | LDPE | Sylox 2 | 2.0% | DHT-4A | 2.0% | 78.8 | 17.1 |
| 6 | ICP | | | | | 88.8 | 25.6 |
| 7 | ICP | DHT-4A | 2.0% | | | 83.4 | 20.0 |
| 8 | ICP | Sylox 2 | 1.0% | | | 82.8 | 18.9 |
| 9 | ICP | Sylox 2 | 2.0% | | | 81.4 | 17.6 |
| 10 | ICP | Sylox 2 | 2.0% | DHT-4A | 2.0% | 80.3 | 16.4 |

EXAMPLE 4

Effect of Different Carrier Resins With or Without Co-Additives

Ca HHPA concentrates with different carrier resins were made as shown in Example 1 and then were let down into injection-molding grade LLDPE resin to make 1.27 mm plaques, as in Example 1. Also, such compositions were let down into LLDPE resin and 1 mil blown film was made from the resulting final composition. Both the injection-molded plaque and blown film haze measurements are listed in Table 4. Let down ratio (LDR) for all samples was 2.5%. The results show that Ca HHPA concentrates with co-additives have better haze even though these concentrates have lower final Ca HHPA loadings than the concentrates without co-additives.

TABLE 4

Effect of Different Carrier Resins with Co-additives

| Sample # | Carrier Resin | DHT-4A loading | Sylox 2 loading | Ca HHPA loading | ZnSt loading | Final CA HHPA loading (ppm) | IM Haze | Peak Tc (C.) | Film % Haze |
|---|---|---|---|---|---|---|---|---|---|
| 1 | 12 MFR HP | | | 4% | 1% | 1000 | 88.9 | | 21.9 |
| 2 | 12 MFR HP | 2% | 2% | 2.67% | 1.33% | 668 | 84.3 | 110.3 | 14.3 |
| 3 | 37 MFR HP | | | 4% | 1% | 1000 | 83.0 | | 22.4 |
| 4 | 37 MFR HP | 2% | 2% | 2.67% | 1.33% | 668 | 80.3 | 111.0 | 15.6 |

TABLE 4-continued

Effect of Different Carrier Resins with Co-additives

| Sample # | Carrier Resin | DHT-4A loading | Sylox 2 loading | Ca HHPA loading | ZnSt loading | Final CA HHPA loading (ppm) | IM Haze | Peak Tc (C.) | Film % Haze |
|---|---|---|---|---|---|---|---|---|---|
| 5 | 11 MFR RCP | | | 4% | 1% | 1000 | 86.6 | | 22.6 |
| 6 | 11 MFR RCP | 2% | 2% | 2.67% | 1.33% | 668 | 87.1 | 111.0 | 16.4 |

EXAMPLE 5

Effect of Different Silicas Upon Performance

Ca HHPA masterbatch concentrates (2.67% Ca HHPA and 1.33% ZnSt) having different co-additives with a polypropylene carrier resin having a melt flow rate of 37 were made as shown in Example 1 and they were let down at 2.5% ratio into injection-molding grade LLDPE resin. Plastic plaques having 667 ppm Ca HHPA loading were injection-molded and plaque haze was measured. The concentrates were also let down into LLDPE resin at 2.5% ratio and blown film was made having 667 ppm final additive loading. Both the injection-molded plaque and blown film hazes were listed in Table 5. Co-additive 1 (DHT-4A) was applied at a loading of 2% in samples 1-6. The results show that silica having the nature of hydrophobic rather than hydrophilic performs somewhat better in terms of haze. Furthermore, the use of relatively large particle size of silica rather than smaller nano-size particles improves performance of the concentrate.

EXAMPLE 6

Effect of Processing Aids

Table 6 lists the performance of concentrates made from Ca HHPA having different processing aids in LLDPE injection-molding and LLDPE blown film, as in Example 1. The results show that certain processing aids improve the performance of Ca HHPA concentrates as well. For example, adding 2% GMS (glycerol monostearate)(Glycolube 825, manufactured by the Lonza Company) decreases the film haze from 16.9 to 15.3% when the carrier resin is a 37 MFR polypropylene homopolymer (HPP).

TABLE 5

Effect of Different Silicas on Haze Performance of Film and Plaques

| Sample # | Co-additive # 2 | Co-additive # 2 property | Co-additive # 2 Loading (%) | LLDPE IM haze | LLDPE Blown film haze |
|---|---|---|---|---|---|
| 1 | Sylox 2 | Hydrophilic, microsize | 2.0% | 81.2 | 18 |
| 2 | Aerosil R972 | Hydrophobic, nanosize | 1.0% | 80.1 | 17.5 |
| 3 | Aerosil R972 | Hydrophobic, nanosize | 2.0% | 80.8 | 15.8 |
| 4 | Sipernat D13 | Hydrophobic, microsize | 1.0% | 81.1 | 13.8 |
| 5 | Sipernat D13 | Hydrophobic, microsize | 2.0% | 78.5 | 14.4 |
| 6 | Aerosil 300 | Hydrophobic, microsize | 2.0% | 79.7 | 18 |

TABLE 6

Effect of Processing Aids Upon Film and Articles

| Description | LLDPE blown film Haze | LLDPE IM haze |
|---|---|---|
| LDPE + 2.67% Ca HHPA + 1.33% ZnSt + 2% DHT-4A + 1% Sylox 2 | 18.9 | 81.6 |
| LDPE + 2.67% Ca HHPA + 1.33% ZnSt + 2% DHT-4A + 2% Sylox 2 | 17.8 | 76.2 |
| LDPE + 2.67% Ca HHPA + 1.33% ZnSt + 2% DHT-4A + 2% Sylox 2 + 2% Acrawax - C (ethylene bis-stearamide) | 17.3 | 79.6 |
| LDPE + 2.67% Ca HHPA + 1.33% ZnSt + 2% DHT-4A + 2% Sylox 2 + 2% GMS (Glycolube 825) | 18.3 | 75.7 |
| LDPE + 2.67% Ca HHPA + 1.33% ZnSt + 2% DHT-4A + 2% Sylox 2 + 2% Kemamide U (oleamide) | 17.5 | 76.8 |
| LDPE + 2.67% Ca HHPA + 1.33% ZnSt + 2% DHT-4A + 2% Sylox 2 + 2% stearic acid | 17.5 | 82.2 |
| HPP + 2.67% Ca HHPA + 1.33% ZnSt + 2% DHT-4A + 2% Sylox 2 | 16.9 | 79.5 |
| HPP + 2.67% Ca HHPA + 1.33% ZnSt + 2% DHT-4A + 2% Sylox 2 + 2% Acrawax - C (EBS) | 17.4 | 86.1 |
| HPP + 2.67% Ca HHPA + 1.33% ZnSt + 2% DHT-4A + 2% Sylox 2 + 2% GMS (Glycolube 825) | 15.3 | 87.6 |
| HPP + 2.67% Ca HHPA + 1.33% ZnSt + 2% DHT-4A + 2% Sylox 2 + 2% Kemamide U (oleamide) | 19.2 | 82.8 |
| HPP + 2.67% Ca HHPA + 1.33% ZnSt + 2% DHT-4A + 2% Sylox 2 + 2% stearic acid | 16.1 | 79.1 |

EXAMPLE 7

Testing to Evaluate the Use of Silica and Hydrotalcite Compounds in Conjunction With Ca HHPA Comparison of Various Other Known Nucleating Agents Concentrates with a twelve melt flow rate homopolymer as the carrier resin were made using the method described in Example 1. Different nucleators and acid scavengers and co-additives are used with the formulation shown in Table 7. The concentrates were let down into a twelve melt flow rate homopolymer and plaques were injection-molded. Plaque haze and Tc are shown in Table 7 as well.

The haze results show that the co-additives are effective in decreasing haze for Ca HHPA regardless of the acid scavenger used, for example, zinc stearate as shown in Example 3 above, calcium stearate, DHT-4A Hydrotalcite. Also, the co-additives help the haze performance of some other clarifiers such as AlpTBBA, NaBz etc. The amount of improvement varies depending on the clarifiers used and the co-additive loading.

However, the co-additives do not seem to improve haze performance for other known commercial nucleators such as;

1) Millad® 3988 (i.e. bis(3,4 dialkylbenzylidene sorbitol acetal); or

2) NA-21® (an organophosphate nucleating agent) sold by Asahi Denka of Japan. In fact, the co-additives of the invention had somewhat negative effects upon haze values for these known nucleating agents.

Given these chemical facts, it is unexpected that the co-additives of this invention, at appropriate concentrations, provide such tangible and significant benefits upon polymer haze and other polymer properties when these additives are used with HHPA-type nucleating agents.

TABLE 7

Effect of the Co-additives of Silica and/or Hydrotalcite When Used with Differing Clarifying Agents

| # | Clarifier | CaSt (ppm) | DHT-4A | Sylox 2 | Clarifier loading in MB (ppm) | MB LDR | Final clarifier loading (ppm) | Haze change | Tc change |
|---|---|---|---|---|---|---|---|---|---|
| 1 | EXP | 800 | | | 4% | 2.5% | 1000 | | |
| 2 | EXP | 800 | 2% | 2% | 4% | 2.5% | 1000 | −6.8% | 1.1% |
| 3 | M3988 | 800 | | | 5% | 5.0% | 2500 | | |
| 4 | M3988 | 800 | 2% | 2% | 5% | 5.0% | 2500 | 17.0% | 0.0% |
| 5 | NA-21 | 800 | | | 5% | 2.0% | 1000 | | |
| 6 | NA-21 | | 2% | 2% | 5% | 2.0% | 1000 | 48.9% | 0.0% |
| 7 | AlpTBBA | 800 | | | 4% | 2.5% | 1000 | | |
| 8 | AlpTBBA | 800 | 2% | 2% | 4% | 2.5% | 1000 | −10.4% | 0.5% |
| 9 | HPN-68 | 800 | | | 4% | 2.5% | 1000 | | |
| 10 | HPN-68 | 800 | 2% | 2% | 4% | 2.5% | 1000 | −4.7% | 0.3% |
| 11 | EXP | | 0.04% | | 4% | 2.5% | 1000 | | |
| 12 | EXP | | 2% | 2% | 4% | 2.5% | 1000 | −8.9% | 1.3% |
| 13 | NA-11 | | 0.04% | | 4% | 2.5% | 1000 | | |
| 14 | NA-11 | | 2% | 2% | 4% | 2.5% | 1000 | 0.6% | 0.5% |
| 15 | NaBz | | 0.04% | | 4% | 2.5% | 1000 | | |
| 16 | NaBz | | 2% | 2% | 4% | 2.5% | 1000 | −3.7% | 0.3% |

"AlpTBBA" refers to aluminium para-tertiary butyl benzoic acid. "NA-11" is an organophosphate nucleating agent sold by Asahi Denka of Japan. "NaBz" refers to sodium benzozate made available through the Kalama Company. Here haze change is calculated as ((haze with co-additives)–(haze without co-additives))/(haze without co-additives). Tc change is calculated as ((Tc with co-additives)–(Tc without co-additives))/(Tc without co-additives).

EXAMPLE 8

Nucleator Loadings and in Different Base Resins

Masterbatch concentrates made using Ca HHPA with a 12 MFR (melt flow rate) homopolymer as the carrier resin and different loadings of Ca HHPA were made using the method described in Example 1. The concentrates were let down into a twelve melt flow rate polypropylene homopolymer and an eleven melt flow rate random copolymer (RCP). Plaques were injection-molded and their haze and Tc are shown in Table 8.

(b) a metal salt compound conforming to the structure:

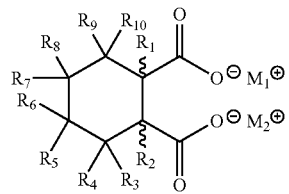

wherein $M_1$ and $M_2$ are the same or different and may be combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$alkyl, hydroxy, $C_1$-$C_9$alkoxy, $C_1$-$C_9$alkyleneoxy, amine, and $C_1$-$C_9$alkylamine, halogens, and phenyl, said metal salt compound being provided in a concentration of greater than about 0.5% by weight of the masterbatch composition;
(c) hydrophilic silica particles;
(d) a hydrotalcite compound; and
(e) zinc stearate.

2. The composition of claim 1 wherein said hydrophilic silica particles are provided in a concentration of less than about 5% by weight of the masterbatch composition.

3. The composition of claim 1 wherein said polyolefin is a polypropylene.

4. The composition of claim 1 wherein said polyolefin is a low density polyethylene or a high density polyethylene.

5. The polyolefin composition of claim 3, wherein said polyolefin is a polypropylene homopolymer.

TABLE 8

Effect of the Co-additives for Different Loadings of Ca HHPA in Various Base Resins

| Carrier resin | Clarifier | Acid scavenger | co-Additive | MB let down | Final Ca HHPA loading (ppm) | Haze (%) | Tc (C.) |
|---|---|---|---|---|---|---|---|
| 12 MFR HPP | 0.67% Ca HHPA | 0.33% ZnSt | N/A | 1.0% | 67 | 42.9 | 120.3 |
| 12 MFR HPP | 0.67% Ca HHPA | 0.33% ZnSt | 2% DHT-4A/ 2% Sylox 2 | 1.0% | 67 | 39.1 | 120.6 |
| 12 MFR HPP | 0.67% Ca HHPA | 0.33% ZnSt | N/A | 10.0% | 667 | 32.3 | 123.3 |
| 12 MFR HPP | 0.67% Ca HHPA | 0.33% ZnSt | 2% DHT-4A/ 2% Sylox 2 | 10.0% | 667 | 32.6 | 123.6 |
| 12 MFR HPP | 6.7% Ca HHPA | 3.3% ZnSt | N/A | 1.0% | 667 | 40.6 | 122.0 |
| 12 MFR HPP | 6.7% Ca HHPA | 3.3% ZnSt | 2% DHT-4A/ 2% Sylox 2 | 1.0% | 667 | 34.7 | 122.3 |
| 12 MFR HPP | 6.7% Ca HHPA | 3.3% ZnSt | N/A | 5.0% | 3335 | 41.6 | 124.0 |
| 12 MFR HPP | 6.7% Ca HHPA | 3.3% ZnSt | 2% DHT-4A/ 2% Sylox 2 | 5.0% | 3335 | 38.2 | 125.0 |
| 11 MFR RCP | 0.67% Ca HHPA | 0.33% ZnSt | N/A | 10.0% | 667 | 31.7 | 112.0 |
| 11 MFR RCP | 0.67% Ca HHPA | 0.33% ZnSt | 2% DHT-4A/ 2% Sylox 2 | 10.0% | 667 | 26.9 | 112.3 |
| 11 MFR RCP | 6.7% Ca HHPA | 3.3% ZnSt | N/A | 1.0% | 667 | 38.1 | 106.0 |
| 11 MFR RCP | 6.7% Ca HHPA | 3.3% ZnSt | 2% DHT-4A/ 2% Sylox 2 | 1.0% | 667 | 32.8 | 107.3 |

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A composition comprising linear low density polyethylene and a masterbatch composition mixed therewith, the masterbatch composition comprising:
(a) a polyolefin selected from the group consisting of polypropylenes, low density polyethylene, high density polyethylene, and mixtures thereof;

6. The composition of claim 1 wherein said metal salt compound conforms to the structure.

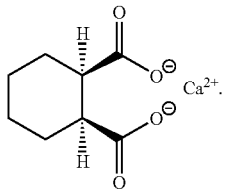

7. The composition of claim 6 wherein said hydrophilic silica particles are present in said masterbatch composition in an amount of about 1% to about 4% by weight of the masterbatch composition.

8. The composition of claim 7 wherein said hydrotalcite compound is present in said masterbatch composition in an amount of about 0.5% to about 6% by weight of the masterbatch composition.

9. The composition of claim 8 wherein said metal salt compound and said zinc stearate are present in the masterbatch composition in a ratio of about 2:1 based on the weight of said metal salt compound and said zinc stearate.

10. A film comprising the composition of claim 1.

11. A blown film comprising the composition of claim 1.

12. An injection molded article comprising the composition of claim 1.

* * * * *

UNITED STATES PATENT AND TRADEMARK OFFICE
CERTIFICATE OF CORRECTION

| | |
|---|---|
| PATENT NO. | : 7,491,762 B2 |
| APPLICATION NO. | : 11/480813 |
| DATED | : February 17, 2009 |
| INVENTOR(S) | : Weihua Sonya Wolters and Kemper David Lake, Jr. |

It is certified that error appears in the above-identified patent and that said Letters Patent is hereby corrected as shown below:

In column 14, line 66, after the word "The", delete the word "polyolefin".

Signed and Sealed this

Twelfth Day of May, 2009

JOHN DOLL
*Acting Director of the United States Patent and Trademark Office*